May 19, 1959  K. B. BREDTSCHNEIDER ET AL  2,887,295
VALVE SEAT CONSTRUCTION
Filed March 23, 1955  2 Sheets-Sheet 1

Inventors.
Kurt B. Bredtschneider &
Edwin J. Hemzacek.
By Joseph O. Lange

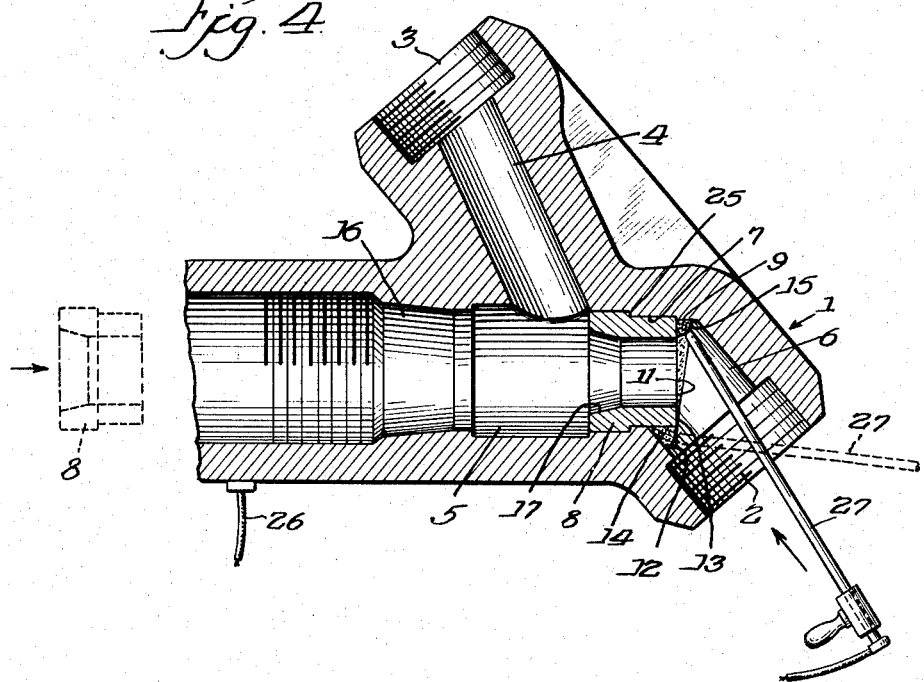

United States Patent Office 2,887,295
Patented May 19, 1959

2,887,295

VALVE SEAT CONSTRUCTION

Kurt B. Bredtschneider and Edwin J. Hemzacek, Chicago, Ill., assignors to Crane Co., Chicago, Ill., a corporation of Illinois Application March 23, 1955, Serial No. 496,195

3 Claims. (Cl. 251—359)

This invention relates generally to a novel valve construction and, more particularly, is concerned with a unique design of valve suitable for welding body seat rings in globe or Y-pattern valves wherein the weld conveniently applied serves the dual purpose of a fluid seal and also enhances the strength of the valve.

At the outset, it should be understood that in many instances in valve manufacture, it becomes desirable to employ a seating material of a metal, alloy or composition other than that of the base material used in the valve casing itself. When integral seats in valves or those which are threadedly applied, are not feasible, then the welding of a separate seat ring member, which may have been previously faced with a dissimilar material, such as a hard facing alloy, for example, such as a cobalt chromium tungsten alloy, may be used.

Heretofore, however, the techniques employed have essentially required that the insertion of the member into the valve body or casing through the outlet and welding through the said port which procedures have had the objections or disadvantages with regard to shifting and also causing distortion which occurs as a result of such welding and which frequently disturbs the alignment of the valve seating port. On the other hand, position welding of a seat ring through the stem and bonnet is difficult because it is too deep and removed.

It is, therefore, one of the more important objects of this invention to provide a valve construction in which in a globe, angle or a Y-pattern valve the seat ring itself may be suitably installed through the ports in which the valve trimmings are applied, such as the valve stem, bonnet or centerpiece openings.

Another object is to provide for a structure in which the valve seat may be suitably contacted by means of a shoulder in the seat bore and in which the seat is welded at its bottom or innermost portion to the valve body through the line connecting opening whereby the valve seat ring will be fixedly positioned at the intersection between the valve bore or chamber for the valve seat ring and the valve inlet.

Another object of this invention is to provide for a valve construction in which the weld or similarly suitable means of attachment can be performed through a side positioned valve opening conveniently by means of a straight electrode and the resultant weld will then assume the form of an oval or ellipse covering a ring area between the valve seat and the valve chamber to effect the attachment and fluid seal therebetween.

Other objects and advantages of our invention will become more readily apparent upon proceeding with the drawings, in which Fig. 1 is a fragmentary sectional view of a Y-pattern body employing our invention.

Fig. 3 is a sectional view taken on the line 3—3 of Fig. 2.

Fig. 4 is a view similar to Fig. 1, showing the manner of the weld application.

Similar reference numerals refer to similar parts throughout the several views.

Figure 1:
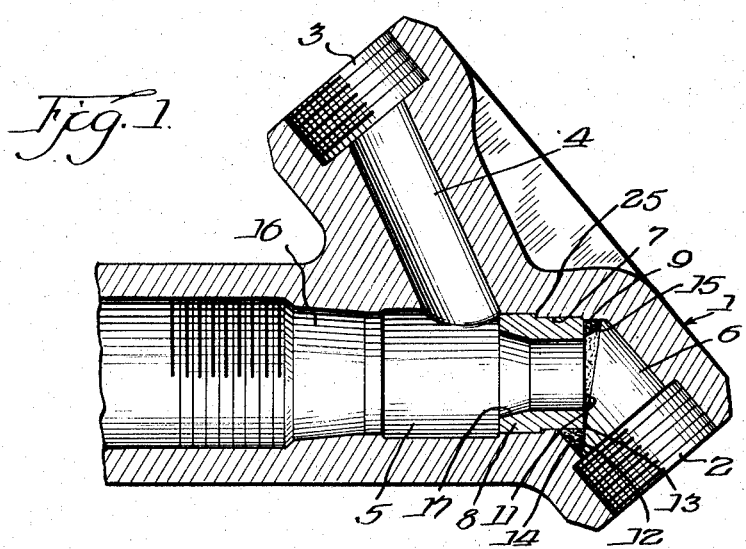

Referring now to Fig. 1, the valve casing, generally designated 1, is shown having the usual inlet port 2 and the outlet port 3 and having therebetween a connecting port 4, the valve chamber 5, connected by means of the ported section 6 with the inlet port 2. Between the chamber 5 and the ported section 6, the valve body is suitably bored as at 7. Received in relatively snug relation, the valve seat ring, the upper corner portion of the ported chamber 6 is provided with an annular shoulder as at 9 to serve as an abutment for the inner peripheral end limit 11 of the seat ring 8. It should be understood that the intersection between the seat ring and the ported chamber will form a weld pass as hereinafter explained at greater length.

The chamber 6 at its opposite disposed portion is suitably recessed as at 12 so as to permit the body seat ring at 13 to project beyond the wall surface recess 12. As mentioned, the chamber 6 communicates with the port 2 of the casing 1. It will be clear that the weld is made by merely filling in an annular portion of the formed connection at 12 with suitable welding metal as indicated at 14. It can easily be approached as evidenced by the drawing (Figs. 3 and 4) by means of a normally straight electrode applied peripherally to form the weld at the said corner 14 as well as at the seat ring end limit 15 at the upper annular portion of the body chamber 6. There is thus formed a fluid tight seal so arranged that its positioning at the inner end limits of the body seat ring enables the weld to be made very easily, efficiently and conveniently through the body ported portion 2 rather than as normally required heretofore through the upper end or bonnet opening as at 16. It will, of course, be appreciated that in the completed valve body construction shown, the usual valve stem is inserted through a bonnet or centerpiece having at its lower end portion a disc or closure member suitably formed to bear in the customary manner against the annular seating surface 17 when the valve is in its closed position.

Thus, it will now be apparent that by a novel arrangement and form of seat ring and body or casing, the seat weld assumes a different form annularly and is thus accessible for such operation as at the valve pipe connecting opening.

Figure 2:
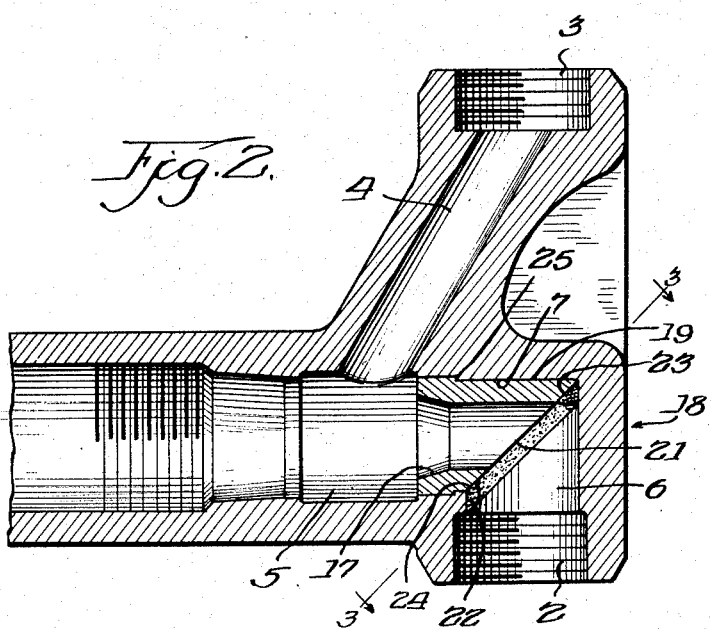
Fig. 2 is a fragmentary sectional view of a globe valve body in modified form.

In the modification shown in Fig. 2, a body or casing 18 is shown having the usual inlet and outlet portions 2 and 3 respectively. In this structure, a seat ring 19 is positioned transversely to the valve port 2, the body seat ring having an inner biased end limit as indicated at 21. Here, similarly, the valve chamber 5 is machined to receive the body seat ring as at 7 having the conventional seat 17 as indicated. In this construction, the end portion of the chamber 6 communicating with the inlet 2 extends transversely to the bored portion 7 at right angles thereto. The body seat ring biased as at 21 receives the weld inner end limits as at 22, the inner end limits 23 and at the outer end 24. In the instant structure, it will be noted that the body seat ring is shouldered preferably as at 25 to assist in the accurate positioning of the body seat ring axially within the casing 18. Incidentally, this shouldering arrangement applies to both forms illustrated. Thus, the body seat ring in each case is insertable through the bonnet opening 5 of the valve body dropped in place (see dotted lines of member 8 shown in Fig. 4) and then is securely held in position by means of the weld applied through the opening 2 and the chamber 6. For the electric weld, the body serves as the ground and in this connection the electrical connection accordingly may be made at 26 or at any other convenient location for such purpose.

It will be noted that the resultant weld will assume an oval configuration as shown more clearly in the sectional view of Fig. 3 which is taken on the line 3—3 of Fig. 2, due to the manner in which it follows the casing wall and end limits of the seat ring.

As shown more clearly in Fig. 4, the simple form of straight electrode 27 can thus be easily applied through the inlet opening 2 thereby to reach all perimetral portions of the casing and seat ring within the chamber 6. The flexibility of the arrangement in applying a straight electrode is graphically shown by the electrode 27 shown in dotted lines. At the same time, it will also be appreciated that the seat 8 to be welded (as at 14 and 15) is conveniently inserted through the opening 5, and by the annular stop formed by the shoulder 25 is properly and accurately positioned axially for the welding operation.

By the employment of the above described invention, it will be apparent that a simple and inexpensive valve seating means has been devised with several operational advantages over presently known devices. And, although this invention has been described in specific forms, it is susceptible to several changes and should, therefore, be limited only by the spirit thereof and the scope of the appended claims.

We claim:

1. In a globe valve body having an inlet and an outlet opening and a valve chamber therebetween, the inlet and the outlet axes being in angular relation to the axis of the said valve chamber, a substantially tubular seat ring with an inlet surface portion insertable through the valve chamber and being welded peripherally at said inlet surface portion to the valve body, the said ring having at least a portion of the inlet surface extending to the intersection of said inlet opening and the valve chamber, the peripheral weld extending at an angle relative to the axis of the said seat ring partly over an outer peripheral portion of the said seat ring to provide a welding bead of oval configuration when viewed in plan and permit welding the seat ring to the body by a straight welding electrode applied through the body inlet opening.

2. In a globe valve body having an inlet, an outlet and a valve chamber therebetween, the inlet and the outlet axes being in angular relation to the axis of the said valve chamber, a substantially tubular seat ring with an inner end portion cut at an acute angle to the longitudinal axis of the said seat ring and insertable through an opening at the upper limits of the valve chamber and being welded to the body on an end inclined surface defining said cut portion of the seat ring to provide a weld bead of oval configuration when said inclined surface of the seat ring is viewed in plan whereby said weld location and arrangement permits welding the said seat ring to the valve body by means of a straight welding electrode applied through the body inlet.

3. In a globe valve body having an inlet, an outlet and a valve chamber therebetween, the inlet and outlet axes being in angular relation to the axis of the valve chamber, a seat ring having its inlet end surface cut at an acute angle to the axis of the valve seat ring to provide an edge of oval configuration when said inlet end surface is viewed in plan and of a length so that said lower oval edge thereof extends relatively snugly into a corner of the body substantially to the intersection of the said inlet opening and the said valve chamber whereby extension of the said inlet end surface of the seat ring to said intersection permits welding the said seat ring to said valve body by means of a straight welding electrode applied through the inlet opening.

References Cited in the file of this patent

UNITED STATES PATENTS

| | | |
|---|---|---|
| 1,802,971 | Fischer | Apr. 28, 1931 |
| 1,935,329 | Needham | Nov. 14, 1933 |
| 2,634,945 | Hobbs | Apr. 14, 1953 |

FOREIGN PATENTS

| | | |
|---|---|---|
| 12,711 | Great Britain | May 23, 1914 |
| 138,368 | Australia | Aug. 16, 1950 |